United States Patent [19]
Risko

[11] 4,139,851
[45] Feb. 13, 1979

[54] TWO LEVEL THRESHOLD CIRCUIT

[75] Inventor: John J. Risko, East Windsor, N.J.

[73] Assignee: RCA Corporation, New York, N.Y.

[21] Appl. No.: 820,917

[22] Filed: Aug. 1, 1977

[30] Foreign Application Priority Data

Nov. 22, 1976 [GB] United Kingdom ............... 48630/76

[51] Int. Cl.² .............................................. G01S 9/24
[52] U.S. Cl. ..................................... 343/17.5; 307/360
[58] Field of Search ................ 343/17.5; 307/360, 358

[56] References Cited
U.S. PATENT DOCUMENTS

| | | | |
|---|---|---|---|
| 4,003,049 | 1/1977 | Sterzer | 343/6 R |
| 4,031,464 | 6/1977 | Norberg | 307/360 |

Primary Examiner—Maynard R. Wilbur
Assistant Examiner—Richard E. Berger
Attorney, Agent, or Firm—H. Christoffersen; Joseph D. Lazar; Raymond E. Smiley

[57] ABSTRACT

Apparatus is responsive to an alternating signal which exceeds a first level, $V_L$, and within a given time, t, exceeds a greater second level, $V_H$, by causing a signal manifestation pulse to issue. The apparatus is responsive to a signal which does not exceed $V_H$ within time t after exceeding $V_L$ causing disablement of the circuit.

5 Claims, 3 Drawing Figures

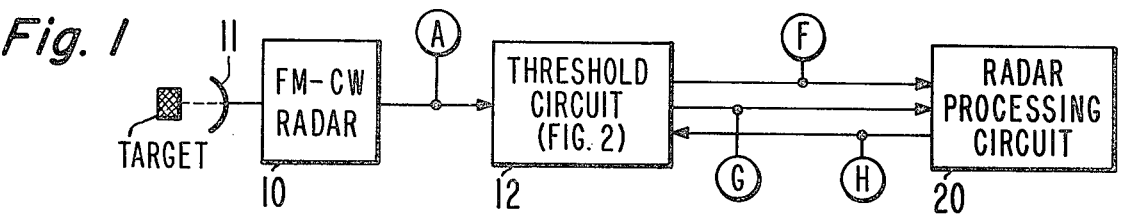
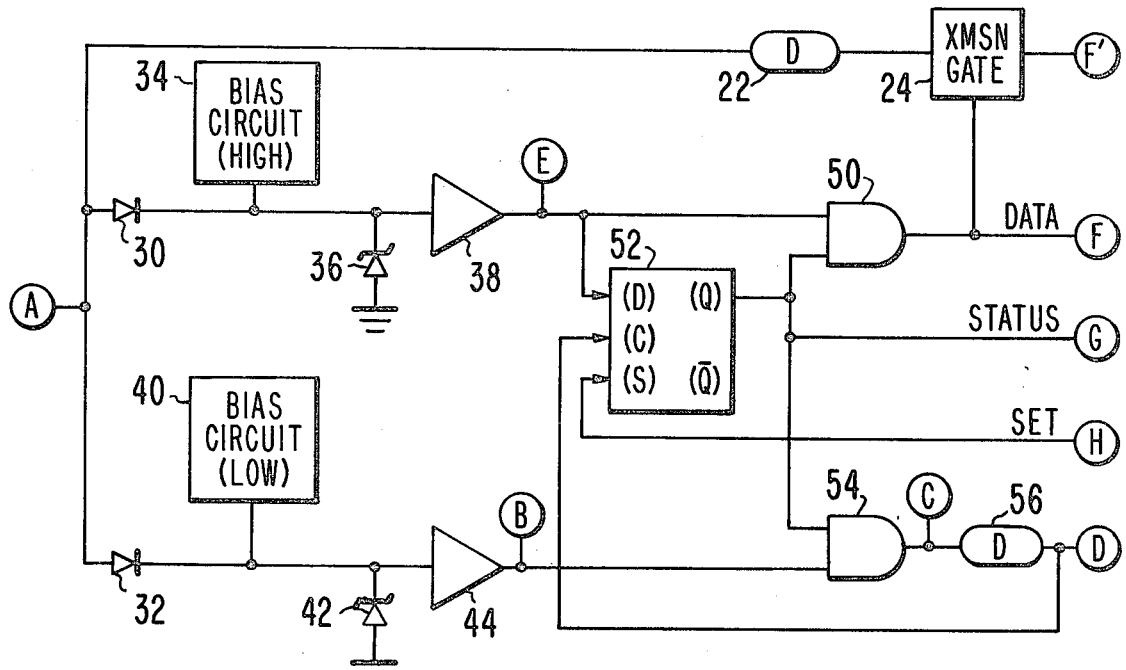
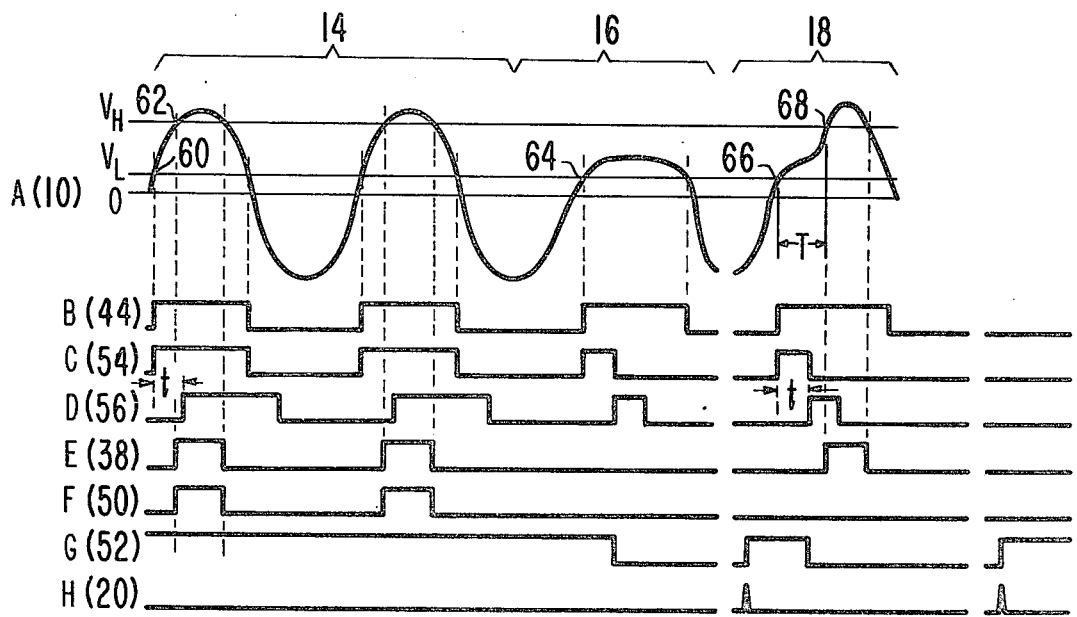

TWO LEVEL THRESHOLD CIRCUIT

The Government has rights in this invention pursuant to Contract No. DOT-HS-5-01275, awarded by the Department of Transportation.

BACKGROUND OF THE INVENTION

Many circuits exist for producing a fixed output signal whenever an alternating input signal exceeds a given value. In some systems, such as in a frequency modulated continuous wave radar (FM-CW), a complex alternating signal may undesirably be produced by the radar in which on a particular cycle the signal level reaches a first low value but either never reaches a higher desired value or reaches it at such a later time as to indicate that the signal is not of an acceptable shape to be processed in the processing portion of the system. Conventional threshold circuits do not handle and detect such a complex waveform as described.

SUMMARY OF THE INVENTION

In accordance with the invention means responsive to an alternating signal is provided for producing one signal if the alternating signal reaches a preselected high value ($V_H$) within a preselected time ($t$) after reaching a relatively low value ($V_L$) and for otherwise producing a second different signal, if the alternating signal does not reach $V_H$ within $t$ after reaching $V_L$.

BRIEF DESCRIPTION OF THE DRAWING

FIG. 1 is a typical FM-CW radar system which utilizes the instant invention;

FIG. 2 is a two level threshold circuit in accordance with the instant invention; and FIG. 3 is a set of waveforms useful in understanding the operation of the circuit of FIG. 2.

DETAILED DESCRIPTION OF A PREFERRED EMBODIMENT

Referring first to FIG. 1 there is shown a typical system in which the circuit of the instant invention may be utilized. An FM-CW radar 10 of the type described in U.S. Pat. No. 4,003,049 issued Jan. 11, 1977, to F. Sterzer et al., is coupled to a threshold circuit 12 at terminal A. Radar 10 as described more fully in the aforementioned U.S. patent (element 10, FIG. 1, thereof) includes a narrow beam antenna 11 which directs a continuous wave signal, modulated in accordance with a triangular waveform, toward targets (one shown). The return signals from the targets are mixed with the emitted signal and the resultant alternating beat frequency signal emitted at terminal A is a manifestation of the range and range rate of each of the respective objects from the radar antenna. Ideally the waveform produced by radar 10, FIG. 1, is of the form illustrated in waveform A, FIG. 3, portion 14, that is, a pure sine wave. Unfortunately, occasionally due to any one of a number of causes such as returns from multiple targets or so called multipath returns in which return signals to the radar take more than one path, a complex waveform may be produced by radar 10 such as that shown in portions 16 and 18 of waveform A, FIG. 3. Waveform portion 16 rises above the relatively low voltage level, $V_L$, but never rises to or above level, $V_H$, before passing back through 0. Waveform 18 rises to $V_L$ and later to $V_H$ but there is a delay T.

Returning to FIG. 1 a threshold circuit 12, in a manner to be described, produces a pulse of constant voltage for each cycle of waveform A, FIG. 3, which passes above $V_H$ during the time that the signal is above $V_H$. The pulses so created by threshold circuit 12 are passed to a suitable utilization device such as a radar processing circuitry 20 such as exemplified by U.S. Pat. No. 3,968,492 issued July 9, 1976 to G.S. Kaplan. Circuit 20 may utilize the information it receives from threshold circuit 12 to ascertain the period of the waveform and from this information to ascertain the range and/or range rate of a target from the radar unit 10. Since waveform portions 16 and 18 of waveform A, FIG. 3 are distorted, these waveforms produce erroneous information as to the period of the waveform if they were processed by processing circuitry 20. It is thus the purpose of circuit 12 to detect such a distorted signal and to prevent the signal from being erroneously processed by processing circuit 20.

In FIG. 2, terminal A of threshold circuit 12 is coupled via an optional delay 22 to an optional transmission gate 24, and to blocking diodes 30 and 32 which as connected prevent the negative going portions of the waveform from passing therebeyond. Delay 22 and transmission gate 24 may or may not be needed depending on the nature of the signal required by the radar processing circuit 20. The cathode of blocking diode 30 is coupled to a bias circuit 34, to a clamping means such as an avalanche diode 36 and to the input terminal of a means, such as a buffer 38, for providing an output signal having a desired waveform when the input signal exceeds a preselected value. Similarly, the cathode of blocking diode 32 is coupled to bias circuit 40, avalanche diode 42 and buffer 44. Buffers 38 and 44 are the type which are responsive to a signal of greater than some value for producing an output signal at some predetermined constant value, such as a voltage corresponding to a logic 1, and to otherwise produce an output signal at a different constant value, such as a voltage corresponding to logic 0. The RCA Corporation, Somerville, N.J. manufactures a model CD4050 buffer amplifier which is suitable for use as buffers 38 and 44. The value of the input signal causing the buffer to produce the logic 0 output signal is determined by the setting of respective bias circuits 34 and 40. Thus, bias circuit 40 is set such that any input signal above the value $V_L$ causes buffer 44 to produce a logic 1 output signal during the time that the input signal remains above $V_L$, while bias circuit 34 is adjusted such that any voltage above $V_H$ causes buffer 38 to produce a logic 1 output signal.

Buffer 38 is connected to one input terminal of AND gate 50 and to the D terminal of a D type flip flop 52. Buffer 44 is connected to one input terminal of an AND gate 54. The Q output terminal of flip flop 52 is coupled to a second input terminal of AND gates 50 and 54, respectively, and to a terminal G at the output of threshold circuit 12. The output terminal F of AND gate 50 is coupled to processing circuit 20 (FIG. 1) and to a control terminal of transmission gate 24. The output terminal F' transmission gate 24 is optionally coupled to processing circuit 20 if desired either at terminal F in place of the output of gate 50 or at an additional terminal (not shown). The output terminal C of AND gate 54 is coupled via a delay 56 to the clock (C) terminal of flip flop 52. A set pulse received at terminal H of circuit 12 is coupled to the set (S) terminal of flip flop 52.

Flip flop 52 is of the type which upon the receipt at the C terminal of the leading of a logic 1 signal from delay 56, will set or reset in accordance with a signal applied at its D terminal. Thus, if the signal applied at the D terminal is logic 1, the Q terminal will be at a logic 1, while if the signal applied at the D terminal is a logic 0, the Q terminal will be at logic 0. A pulse received at the (S) terminal will set flip flop 52 to a condition such that the Q terminal is at a logic 1 regardless of any simultaneous inputs received at the C and D terminals.

Operation of radar apparatus illustrated in FIGS. 1 and 2 will be facilitated by reference to the waveforms of FIG. 3 where the letters to the left of the waveforms refer to similarly lettered terminals in FIGS. 1 and 2. In operation, radar unit 10, FIG. 1, produces at terminal A thereof an alternating signal beat frequency which is applied to blocking diodes 30 and 32 of FIG. 2.

When waveform A, FIG. 3 passes through $V_L$ (point 60) the output signal from buffer 44 changes from a logic 0 to a logic 1. It is initially assumed that flip flop 52 is in a set condition such that the Q terminal is at a logic 1 and thus AND gates 50 and 54 are primed. Therefore, the logic 1 signal from buffer 44 enables AND gate 54 producing a logic 1 signal at delay 56. The logic 1 signal is produced at the output terminal D of delay 56 at a time, t, following receipt of the logic 1 signal at gate 54. As the above described actions are occurring, waveform A, FIG. 3, passes through voltage level, $V_H$, at a point 62, which follows passage through $V_L$ at point 60 by less than time t. When the waveform passes through voltage level $V_H$ buffer 38 is activated to produce a logic 1 which is applied to primed AND gate 50.

With an ideal sinewave, as in portion 14 of waveform A, FIG. 3, the logic 1 from buffer 38 will be applied to AND gate 50 and the D terminal of flip flop 52 before the logic 1 pulse applied to AND gate 54 enables the AND gate causing a logic 1 pulse to appear at terminal D of delay 56. The logic 1 at terminal D of delay 56 provides the clock signal to flip flop 52. Thus, after delay time t occasioned by the combined delay in 56 and AND gate 54 when flip flop 52 is clocked, the logic 1 signal appearing at its D terminal from buffer 38 will cause the flip flop to remain set. Concurrently, the logic 1 signal from buffer 38 enables AND gate 50 which produces a logic 1 signal at terminal F which is passed to the radar processing circuitry 20 (FIG. 1) for conventional processing.

If optional transmission gate 24 is utilized, the logic 1 pulse from AND gate 50 enables transmission gate 24 to pass the waveform received at terminal A from radar 10 (FIG. 1) to radar processing circuit 20 (FIG. 1) in those cases where the actual waveform rather than a signal representing the actual waveform is required by circuit 20 for processing. Further, if it is desired to pass waveform A (FIG. 3) only after it has been assured that the voltage of waveform A reaches $V_H$, delay 22, having a delay time equal to that in delay 56, may be provided.

Waveform A portions 16 and 18 are two examples of waveforms which cause the disabling of the circuit of FIG. 2. When waveform A, portion 16 is received at terminal A of threshold circuit 12, the waveform passes above $V_L$ at a point 64 causing AND gate 54 to be again enabled. However, buffer 38 is not caused to produce a logic 1 since the waveform never passes to the voltage level $V_H$. Therefore, when logic 1 from AND gate 54 propagates through delay 56 to clock flip flop 52 the input at its D terminal is a logic 0. As a result of the clock pulse received at the C terminal, flip flop 52 is reset such that its Q terminal is at logic 0. When this action occurs the logic 0 output of the Q terminal disables AND gates 50 and 54 from passing any further signal until the flip flop 52 is once again set at its S terminal. Thus, all future positive going cycles of waveform A are not permitted to create logic 1 pulses at the output terminal 2 of AND gate 50. At some appropriate time, such as at the turn around times of the modulating waveform of radar unit 10 (as described in the aforementioned Sterzer et al. patent), a Set signal may be produced by processing circuit 20 which is applied at the S terminal of flip flop 52 causing the flip flop to once again set and therefore permit the threshold circuit 12 to once again be operative to create pulses timed to correspond to waveform A.

Waveform A portion 18 is a second example of a condition in which threshold circuit 12 is disabled. When waveform A portion 18 is received at terminal A of threshold circuit 12 the waveform upon reaching voltage level $V_L$ at point 66 enables AND gate 54 which produces a clock pulse at time t later. However, since time T is greater than time t, buffer 38 will be producing logic 0 at the expiration of delay in delay 56 and flip flop 52 will again be reset prior to the time that the waveform reaches voltage level $V_H$ at point 68. Thus, in this example, flip flop 52 is reset and the threshold circuit 12 is disabled as previously described until a Set pulse is once again received at terminal H.

It should be noted that if the maximum amount of time between the time that the waveform passes from voltage level $V_L$ to $V_H$ is sufficiently small, the delay occasioned in AND gate 54 may provde the delay t so that a formal delay means 56 is not required. In one exemplary embodiment the delay in AND gate 54 is 0.2 microseconds which is greater than the expected time for the input waveform to pass from voltage $V_L$ to voltage $V_H$ and as such no delay 56 is required.

It will be appreciated that although the exemplary circuit of FIG. 2 operates on positive going signals, a similar circuit may operate on a negative going signal by simply reversing the polarities of diodes 30, 32, 36 and 42, respectively. It will also be appreciated that one of the two voltage levels such as $V_H$ may be above some reference, such as ground, while the other voltage level such as $V_L$ may be below that reference voltage. In such a situation diodes 30 and 36 will be as illustrated while diodes 32 and 42 will be reversed.

What is claimed is:

1. A threshold circuit receptive of an alternating signal and comprising in combination:
   means responsive to said alternating signal exceeding a first relatively lower preselected value ($V_L$) for producing a first output signal corresponding thereto;
   means responsive to said alternating signal exceeding a second relatively higher preselected value ($V_H$) for producing a second output signal corresponding thereto;
   means responsive to said first and second output signals for producing a third output signal having a first value when said alternating signal reaches value $V_H$ within time t after reaching value $V_L$ and for producing a third output signal having a second different value when said alternating signal does not reach value $V_H$ within time t after reaching value $V_L$ and
   means responsive to said third output signal at said second different value for producing a signal to thereafter inhibit said third output signal at said first value.

2. The combinationa as set forth in claim 1 wherein said inhibiting means is resettable upon receipt of a pulse and further including means producing said pulse to reset said inhibiting means to a non-inhibited condition subsequent to its being placed in a inhibiting condition.

3. The combination as set forth in claim 1 further including an FM-CW radar for producing a beat frequency signal being said alternating signal applied to said threshold circuit.

4. The combination as set forth in claim 1 wherein said means responsive to said alternating signal reaching value $V_L$ and value $V_H$ respectively comprises respective buffers responsive to said signal reaching said values $V_L$ and $V_H$ respectively for producing a first constant value output signal and for otherwise producing a second different constant output signal.

5. The combination as set forth in claim 4 wherein said means responsive to said first and second output signals comprises a first AND gate responsive to signals from said first buffer and second AND gate responsive to signals from said second buffer and further comprising a D type flip flop normally set to a condition such that its Q output terminal is at a logic 1 condition, said Q output terminal being coupled to respective second input terminals of said first and second AND gates and wherein the D input terminal of said flip flop is coupled to said first buffer and wherein the clock terminal of said D type flip flop is responsive to an output signal from said second AND gate delayed for time t from the receipt of the logic 1 signal from said second buffer at said second AND gate and wherein upon receipt of the logic 1 signal at the clock terminal of said flip flop, the input at said D terminal is not at a logic 1, said flip flop is reset such that its Q terminal is at a logic 0 and such that said first and second AND gates are disabled.

* * * * *